(12) United States Patent
Owens

(10) Patent No.: US 11,137,362 B2
(45) Date of Patent: Oct. 5, 2021

(54) METHOD FOR ASSESSING THE LONG-TERM THERMAL RESISTANCE OF CLOSED-CELL THERMAL INSULATING FOAMS AT MULTIPLE MEAN TEMPERATURES

(71) Applicant: Covestro LLC, Pittsburgh, PA (US)

(72) Inventor: Steven G. Owens, Sewickley, PA (US)

(73) Assignee: Covestro LLC, Pittsburgh, PA (US)

( * ) Notice: Subject to any disclaimer, the term of this patent is extended or adjusted under 35 U.S.C. 154(b) by 56 days.

(21) Appl. No.: 16/708,525

(22) Filed: Dec. 10, 2019

(65) Prior Publication Data
US 2021/0172893 A1    Jun. 10, 2021

(51) Int. Cl.
*G01N 25/18* (2006.01)
*G01N 27/18* (2006.01)
*G01K 17/20* (2006.01)

(52) U.S. Cl.
CPC ............. *G01N 25/18* (2013.01); *G01N 27/18* (2013.01); *G01K 17/20* (2013.01)

(58) Field of Classification Search
USPC ..................................... 374/44, 43, 163, 208
See application file for complete search history.

(56) References Cited

U.S. PATENT DOCUMENTS

| | | |
|---|---|---|
| 2,484,736 A | 10/1949 | Storey |
| 2,878,669 A | 3/1959 | Knndson |
| 3,045,473 A | 7/1962 | Hager, Jr. |
| 3,075,377 A | 1/1963 | Lang |
| 3,194,071 A | 7/1965 | Hager, Jr. |
| 3,256,734 A | 6/1966 | Storke, Jr. |

(Continued)

FOREIGN PATENT DOCUMENTS

| | | |
|---|---|---|
| GB | 1593425 A | 7/1981 |
| JP | 63290949 A | 11/1988 |

(Continued)

OTHER PUBLICATIONS

ASTM C1303/C1303M-15 (Year: 2015).*
ASTM C518-17 (Year: 2017).*
Abstract for CAN/ULC-S770-09 (Year: 2009).*

*Primary Examiner* — Mirellys Jagan
(74) *Attorney, Agent, or Firm* — Donald R. Palladino

(57) ABSTRACT

Methods for measuring long-term thermal resistance of closed-cell foam. The methods include: (a) placing a stack of slices cut from a sample of the foam between two isothermal plates in a calibrated heat flow meter comprising a heat flux transducer; (b) measuring an initial thermal resistance of the same stack of slices at a plurality of preselected mean temperatures within the temperature range of 10° F. to 150° F. wherein the stack of foam slices stays inside the heat flow meter throughout step (b); (c) at a time calculated to represent a selected aging period of the foam, placing the same stack of slices between two isothermal plates in a calibrated heat flow meter and measuring the thermal resistance of the stack of slices at a plurality of preselected mean temperatures within the temperature range of 10° F. to 150° F. wherein the stack of foam slices stays inside the heat flow meter throughout the measuring portion of step (c); and (d) calculating the long-term thermal resistance of the foam at each of the plurality of preselected mean temperatures.

12 Claims, 3 Drawing Sheets

(56) References Cited

U.S. PATENT DOCUMENTS

| | | | |
|---|---|---|---|
| 3,266,290 A | 8/1966 | Haacke | |
| 3,363,485 A | * 1/1968 | Holloway | B23B 29/0341 |
| | | | 408/153 |
| 3,533,274 A | 10/1970 | Rogers et al. | |
| 3,733,887 A | 5/1973 | Stanley et al. | |
| 3,987,660 A | 10/1976 | Pelanne | |
| 4,155,244 A | 5/1979 | Bhattacharyya | |
| 4,398,009 A | 8/1983 | Ahne et al. | |
| 4,553,852 A | 11/1985 | Derderian et al. | |
| 4,630,938 A | 12/1986 | Piorkowska-Palczewska et al. | |
| 4,647,221 A | 3/1987 | Szabo | |
| 4,653,507 A | 3/1987 | Laudadio | |
| 5,005,985 A | 4/1991 | Piorkowska-Galeska et al. | |
| 5,038,304 A | 8/1991 | Bonne | |
| 5,099,441 A | 3/1992 | Mazzio | |
| 5,112,136 A | 5/1992 | Sakuma et al. | |
| 5,258,929 A | 11/1993 | Tsuchida | |
| 5,297,868 A | 3/1994 | Graebner | |
| 5,940,784 A | 8/1999 | El-Husayni | |
| 6,142,662 A | * 11/2000 | Narh | G01N 25/18 |
| | | | 374/29 |
| 6,408,256 B1 | 6/2002 | Hittle et al. | |
| 6,676,287 B1 | 1/2004 | Mathis et al. | |
| 6,742,926 B1 | 6/2004 | Fesmire et al. | |
| 2002/0136261 A1 | 9/2002 | Naka et al. | |
| 2003/0072349 A1 | 4/2003 | Masaki et al. | |
| 2005/0105584 A1 | 5/2005 | Ichikawa et al. | |
| 2005/0259714 A1 | 11/2005 | Lozinski | |
| 2006/0256835 A1 | 11/2006 | Romes | |
| 2012/0294329 A1 | 11/2012 | Miller et al. | |
| 2014/0010258 A1 | 1/2014 | Hyun et al. | |
| 2014/0286373 A1 | 9/2014 | Thresher et al. | |

FOREIGN PATENT DOCUMENTS

| | | |
|---|---|---|
| JP | 1169346 A | 7/1989 |
| RU | 2633405 C1 | 10/2017 |
| SU | 800845 A1 | 1/1981 |

* cited by examiner

METHOD FOR ASSESSING THE LONG-TERM THERMAL RESISTANCE OF CLOSED-CELL THERMAL INSULATING FOAMS AT MULTIPLE MEAN TEMPERATURES

FIELD

This specification relates to time, material and space efficient methods for assessing the long-term thermal resistance of closed-cell thermal insulating foams, such as extruded polystyrene, expanded polystyrene, polyurethane and polyisocyanurate foams, at multiple different mean temperatures.

BACKGROUND

Insulation plays an important role in the energy efficiency and environmental impact of building envelopes. In many cases, foam insulation, such as polyisocyanurate foam insulation, is used for building insulation. As a result, it is important to understand the thermal resistance performance of foam insulation.

One method for measuring the thermal resistance of a test sample of foam insulation is by using a heat flow meter in which a test sample is placed between two flat plates that are maintained at known, but different, temperatures. As heat flows through the test sample from the hot side to the cold side, a heat flux transducer measures the amount of heat transferred. Temperature, heat flux, and thickness measuring device(s) measure the temperatures and heat flux across the test sample as well as the distance between the hot and cold plates and the thermal conductivity of the test sample can be calculated based on the measured values. Such measurements are often done in accordance with standard testing methods such as ASTM C 518, such as, for example, editions -17, -15, -10, and -04, which are incorporated herein by reference. The resulting measurements allow for assignment of an "R-value" to the foam insulation. One advantage of using a heat flow meter to measure thermal conductivity at a particular mean temperature (i.e., the mean temperature between the hot plate and the cold plate) is that the test can be run relatively quickly and it does not require a highly skilled operator.

Long term thermal resistance ("LTTR") is a standard accelerated aging technique representing the 5-year aged R-value of building insulation comprised of a cellular plastic insulation that contains gases other than air where the composition of the retained gases changes with time. Typically, the LTTR is reported at a single mean temperature, such as 75° F. In reality, however, the R-value, and therefore the LTTR R-value, of foam insulation can, in at least some cases, vary depending on the temperature to which the foam insulation is exposed. As a result, the representation of R-value at a single mean temperature may not accurately reflect the thermal insulation performance of foam insulation across the full range of exposure temperatures.

Standard methods for measuring the LTTR of closed-cell foam by using a heat flow meter are described by ASTM C1303/C1303M, such as, for example, editions -19, -14, -11a, -11, -10, -09a, and -09 and by CAN/ULC-S770, such as, for example, editions -09 and -15. Neither of these methods, however, contemplates measuring thermal resistance, and, as a result, calculating the LTTR of such foam, at a multitude of mean temperatures. Indeed, if one were to follow the methods described by these standards to measure the LTTR of foam insulation at several mean temperatures, such as 10 or more, the process would be very time-consuming, labor intensive, and would require the generation of many samples. With respect to CAN/ULC-S770-09 in particular, this is due to the fact that each measurement takes about 1 hour to complete, but the standard requires measurement of an initial thermal resistance within 2 hours of when slices formed from a foam board are cut.

As a result, it would be desirable to provide a method for assessing the LTTR of foam insulation at a multitude of mean temperatures. It would be particularly useful if such a method could provide results quickly while using a minimal amount of foam samples.

The present invention was made in view of the foregoing.

SUMMARY OF THE INVENTION

This specification is directed to methods for measuring long-term thermal resistance of closed-cell foam.

In some respects, these methods comprise: (a) placing a stack of slices cut from a sample of the foam between two isothermal plates in a calibrated heat flow meter comprising a heat flux transducer; (b) measuring an initial thermal resistance of the stack of slices at a plurality of preselected mean temperatures within the temperature range of 10° F. to 150° F., wherein the stack of foam slices stays inside the heat flow meter throughout step (b); (c) at a time calculated to represent a selected aging period of the foam, placing the stack of slices between two isothermal plates in a calibrated heat flow meter and measuring the thermal resistance of the stack of slices at a plurality of preselected mean temperatures within the temperature range of 10° F. to 150° F., wherein the stack of foam slices stays inside the heat flow meter throughout the measuring portion of step (c); and (d) calculating the long-term thermal resistance of the foam at each of the plurality of preselected mean temperatures.

In other respects, the methods comprise: (a) determining an initial thermal resistance of a full thickness sample of the foam board by placing the full thickness sample between two isothermal plates in a calibrated heat flow meter comprising a heat flux transducer, the initial thermal resistance of the full thickness sample being determined at a plurality of preselected mean temperatures within the temperature range of 10° F. to 150° F., wherein the full thickness sample is kept inside the heat flow meter throughout step (a); (b) preparing a stack of core slices and a stack of surface slices from the foam board; (c) placing a stack of slices from the foam board between two isothermal plates in a calibrated heat flow meter comprising a heat flux transducer; (d) measuring an initial thermal resistance of the slack of foam board slices at a plurality of preselected mean temperatures within the temperature range of 10° F. to 150° F., such measurement occurring within 14 days after the foam board is produced, wherein the stack of foam slices is kept inside the heat flow meter throughout step (d); (e) removing the stack of foam slices from the heat flow meter; (f) at a time calculated to represent a selected aging period of the foam, placing the stack of slices between two isothermal plates in a calibrated heat flow meter and measuring the thermal resistance of the stack of slices at a plurality of preselected mean temperatures within the temperature range of 10° F. to 150° F., wherein the stack of foam slices is kept inside the heat flow meter through step (f); (g) repeating steps (c) through (f) for each stack of core slices and each stack of surface slices prepared in step (b); (h) determining an aging factor of each stack of core slices and each stack of surface slices at each of the plurality of preselected mean temperatures; and (i) calculating the long-term thermal resistance of the foam board at each of the plurality of mean temperatures.

DETAILED DESCRIPTION

Figure 1:
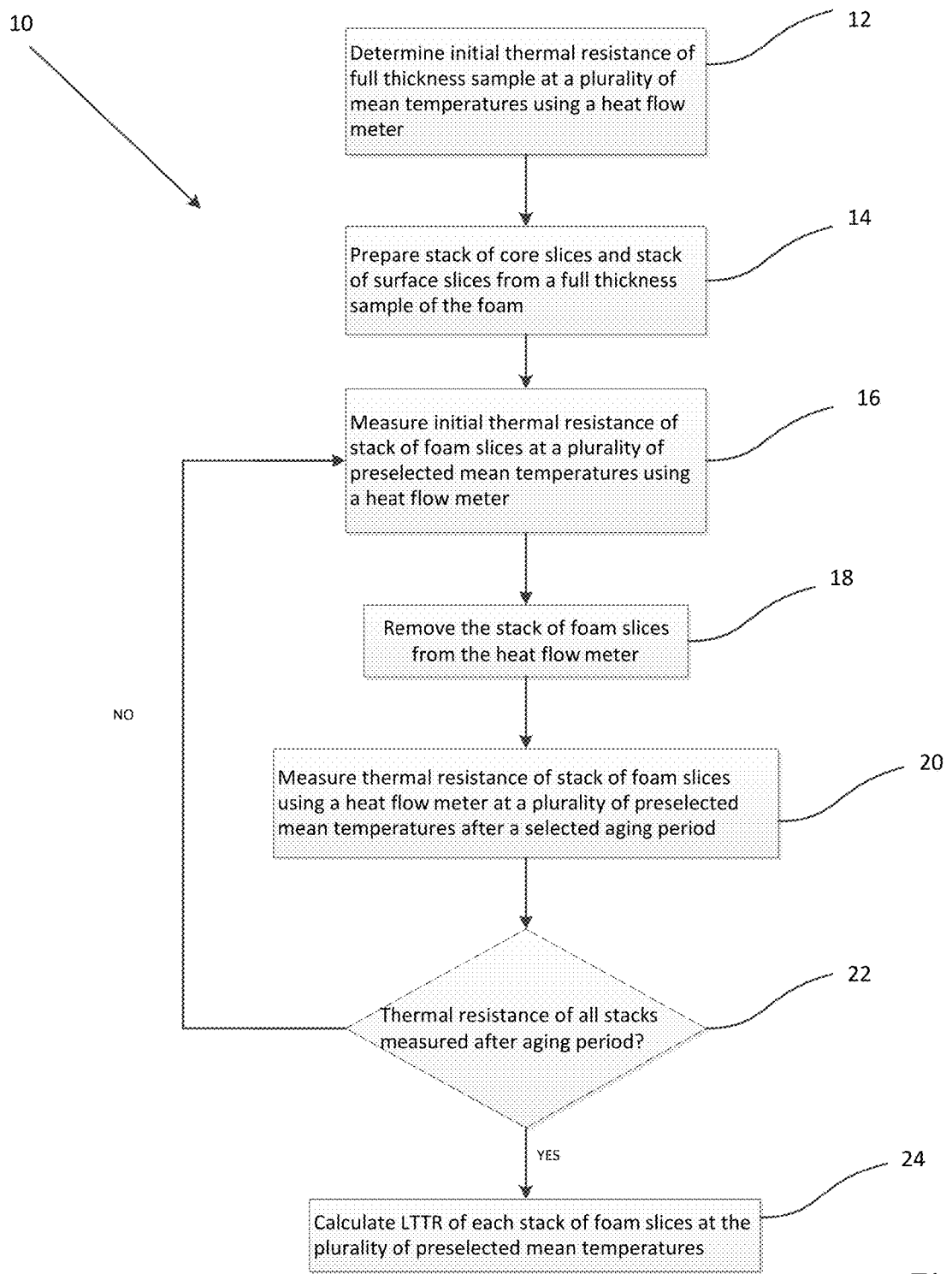
FIG. 1 is a step diagram of a method for measuring long-term thermal resistance of closed-cell foam according to some non-limiting embodiments or aspects.

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, unless otherwise expressly indicated, all numerical parameters are to be understood as being prefaced and modified in all instances by the term "about", in which the numerical parameters possess the inherent variability characteristic of the underlying measurement technique used to determine the numerical value of the parameter. At the very least, but without limiting the application of the doctrine of equivalents to the claims, each numerical parameter described in this specification should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As indicated, embodiments of this specification are directed to methods for measuring long-term thermal resistance of closed-cell foam. In certain implementations, the foam is embodied in the form of a foam board, though other foam configurations can be readily envisioned. As used in this specification, the term "foam board" refers to boards comprising foam, such as, for example, polyisocyanurate (sometimes referred to as "polyiso") foam, expanded polystyrene foam, extruded polystyrene foam, or phenolic foam. As used herein, "foam" refers to a substance that is formed by trapping pockets of gas in a liquid or solid. In some implementations, the foams are produced using a physical blowing agent which remains trapped in the cells, examples of which include hydrocarbons (such as any of the pentane isomers including n-pentane, cyclopentane and/or isopentane) and halogenated blowing agents, including hydrofluoroolefins (HFOs), such as, hydrochlorofluoroolefins ("HCFO"), for example, 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), and 2-chloro-1,1,1,3,4,4,4-heptafluorobutene-2 (E and/or Z isomers), pentafluoropropane, tetrafluoropropene, 2,3,3,3-tetrafluoropropene, 1,2,3,3-tetrafluoropropene, trifluoropropene, tetrafluorobutene, pentafluorobutene, hexafluorobutene, heptafluorobutene, heptafluoropentene, octafluoropentene, and nonafluoropentene.

The foams described in this specification are "closed-cell" foams. The term "closed-cell foam", as used in this specification, means that the foam has a closed cell content of at least 80%, sometimes at least 90%, when measured according to ASTM D6226-15, which is incorporated herein by reference. In certain implementations, the foams described in this specification are "rigid" foams. The term "rigid foam" refers to a foam having a ratio of compressive strength to tensile strength of at least 0.5:1, elongation of less than 10%, and a low recovery rate from distortion and a low elastic limit, as described in "Polyurethanes: Chemistry and Technology, Part II Technology," J. H. Saunders & K. C. Frisch, Interscience Publishers, 1964, page 239, which is incorporated herein by reference. The term "board", as used in this specification, refers to a solid, relatively thin and flat slab of material, which in some cases, has a rectangular or square shape. In some embodiments, the foam boards described herein have a thickness of no more than 3 inches (7.62 cm), such as a thickness of 1 to 3 inches (2.54 to 7.62 cm), 1½ to 3 inches (3.81 to 7.62 cm) or 2 inches (5.08 cm).

In some implementations, the initial thermal resistance of a full thickness sample of the foam, such as a foam board, is determined at a plurality of mean temperatures within the temperature range of 10° F. to 150° F. such as 10° F. to 105° F. or 20° F. to 75° F. For example, in some cases, three (3) such samples are provided (such as a sample that is a 12"×12" square) and the thermal resistance is determined at a single mean temperature, such as 75° F., using a heat flow meter by placing the full thickness sample between two isothermal plates in a calibrated heat flow meter comprising a heat flux transducer. Then, the sample having a thermal resistance that is nearest to the mean thermal resistance of the three (3) samples is evaluated for its initial thermal resistance at a plurality of mean temperatures, in the manner described below with respect to the stacks of foam board slices. The full thickness sample is kept inside the heat flow meter throughout this process. As used herein, "full thickness" means that the thickness of the sample is the same as the thickness of the foam, such as a foam board, from which the sample was obtained.

The methods of this specification comprise, as one step, placing a stack of slices cut from the foam sample between two isothermal plates in a calibrated heat flow meter comprising a heat flux transducer. The slices can be provided by, for example, cutting a sample from a foam board in a direction generally perpendicular to the longest dimension of the foam board to provide, for example, square samples having a width of 300 millimeters and a length of 300 millimeters. The sample is then sliced in a direction generally parallel to the longest dimension of the foam board to provide at least two slices adjacent to each surface of the foam board (referred to herein as "surface slices") and at least two slices from the interior portion of the foam board (referred to herein as "core slices"), in which each of the slices have a thickness less than the full thickness of the foam, such as the foam board. In some implementations, each slice has a thickness of foam that is at least 10 millimeters.

According to implementations of the methods of this specification, a stack of surface slices and a stack of core slices are provided. Each stack, in some implementations, contains at least four slices. For example, one stack may have four surface slices and another stack may have four core slices, each slice within a stack being oriented in the same direction.

In the methods of this specification, each stack of slices is placed in a heat flow meter. Suitable heat flow meters are described by ASTM C518-17 (Sections 5 and 6), which is incorporated herein by reference. As described therein, a heat flow meter of the type contemplated for use in the methods of this specification includes two isothermal plates and at least one heat flux transducer. In such a device, a heat flux transducer may be oriented between the specimen to be tested and one of the plates (the specimen itself being oriented between the two plates), a heat flux transducer may be oriented between two specimens that are oriented between the two plates, or, in some cases, a heat flux transducer may be oriented between the specimen to the tested and each of the two plates (the specimen itself being oriented between the two plates). The principle of operation of such a heat flow meter is described, for example, in U.S. Pat. No. 4,155,244 at col. 1, line 50 to col. 2, line 2, the cited portion of which being incorporated herein by reference.

According to the methods described herein, as another step, the initial thermal resistance of the same stack of slices is measured at a plurality of preselected mean temperatures within the temperature range of 10° F. to 150° F., such as 10° F. to 105° F., or 20° F. to 75° F. In some implementations, the initial thermal resistance of the stack of slices is measured at at least 5, at least 6 at least 8, at least 9, or in some cases, at least 10 or at least 12 different preselected mean temperatures within the temperature range of 10° F. to 150° F., such as 10° F. to 105° F., or 20° F. to 75° F. In some implementations, the initial thermal resistance of the stack of slices is measured no more than 14 days, in some cases, during the period that is 10 to 14 days after the date of production of the foam.

For purposes of the methods of this specification, thermal resistance is measured according to the standard test method described by any of the prior and future revisions of ASTM C518 ("Steady-State Thermal Transmission Properties by Means of the Heat Flow Meter Apparatus"), such as -17.

As indicated, in the methods of this specification, the initial thermal resistance of the same stack of slices is measured at the plurality of preselected mean temperatures. Moreover, the stack of slices stays inside the heat flow meter apparatus throughout the step of measuring the initial thermal resistance of each stack of slices at the plurality of preselected mean temperatures. In fact, it was a surprising discovery that the thermal resistance of a stack of foam slices remained consistent over several readings taken over several hours of testing at the same mean temperature. It is believed that this result was surprising because, according to the CAN/ULC-S770-09 (Standard Test Method For Determination of Long-Term Thermal Resistance Of Closed-Cell Thermal Insulating Foams), it was believed to be essential to measure the thermal resistance of the stack of foam slices within 2 hours of producing the foam slices, because it was believed that the resulting thin slices would age very rapidly. As a result, since each thermal resistance measurement may take about 1 hour to complete, it would be impossible, according to the procedure described in CAN/ULC-S770-09, to measure the thermal resistance of the same stack of slices at the plurality of preselected mean temperatures contemplated by the methods described herein. As a result, in order to determine the LTTR of a foam at a plurality of preselected mean temperatures, several different foam samples would need to be produced and tested, which would be very time-consuming, labor intensive, and would require the generation of many samples. The discovery described above, however, enables the methods of this specification, which can provide accurate results far more quickly while using significantly fewer foam samples, thereby significantly reducing waste. Without being bound by any particular theory, it is currently believed that, by leaving the stack of foam slices in the heat flow meter under pressure between the two isothermal plates, the slices do not significantly age because there is not sufficient air flow through the slices to allow for the physical blowing agent, such as a hydrocarbon (such as a pentane), present in the foam cells to be replaced by air. As a result, the thermal resistance of a stack of foam slices remains consistent over several readings taken over several hours of testing at the same mean temperature.

Typically, the stack of foam slices is removed from the heat flow meter between the step of measuring the initial thermal resistance of the stack of slices at a plurality of preselected mean temperatures and step of measuring the thermal resistance of the stack of slices at a plurality of preselected mean temperatures at a time calculated to represent a selected aging period of the foam. During this removal the foam slices are separated from each other so that the major surfaces of each slice is exposed to ambient air conditions at 18-28° C. and 30-70% relative humidity.

As previously indicated, in the methods of this specification, at a later time, as yet another step, the stack of slices are again placed between the two isothermal plates in a calibrated heat flow meter and the thermal resistance of the stack of slices is again measured at a plurality of, such as at least 5, at least 6 at least 8, at least 9, or in some cases, at least 10 or at least 12 different, preselected mean temperatures within the temperature range of 10° F. to 150° F., such as 10° F. to 105° F., or 20° F. to 75° F. As will be appreciated, it will often be desirable that this subsequent measurement of the thermal resistance of the stack of slices is conducted at the same plurality of preselected temperatures at which the initial thermal resistance values were measured. Moreover, as with measuring the initial thermal resistance, the stack of slices stays inside the heat flow meter apparatus throughout the step of subsequently measuring the thermal resistance of the stack of slices at the plurality of preselected mean temperatures.

The subsequent measurement of the thermal resistance of the stack of slices is conducted at a time calculated to represent a selected aging period of the sliced foam, such as a period of 5 years or more. As will be appreciated, this time period can vary based on the foam thickness for which the LTTR calculation is desired, such as +1 inch, actual, or −1 inch of the actual board thickness, as well as the actual thickness of the foam board and the thickness of the core and surface slices. One suitable way for determining the time that represents the aging of the sliced foam after a given time period is described in CAN/ULC-S770-09, Section 6.5.6, which is incorporated herein by reference. According to this method, the following equation is used:

$$t = (T_1/T_2)^2 * t_a$$

where t is the time (in days) that represents aging of a sliced foam after 5 years, $t_a$ is the aging period (in days), for example, $t_a$=1826 days for a 5 year aging period and 2191 for a 6 year aging period, $T_1$ is the thickness of the sliced foam (in millimeters) and $T_2$ is the thickness of the foam board product (in millimeters).

According to the methods of this specification, the foregoing process is repeated for each stack of core slices and each stack of surface slices that is prepared.

According to the methods of this specification, as still another step, the long-term thermal resistance of the foam at each of the plurality of preselected mean temperatures is calculated. A suitable, but not limiting, method for making such a calculation is described in Section 7 of CAN/ULC-S770-09 (Section 7.1), which is incorporated herein by reference. For example, in some implementations, long-term thermal resistance at each of the plurality of preselected mean temperatures can be calculated by first determining an aging factor of each stack of slices at each of the plurality of preselected mean temperatures by dividing the initial thermal resistance of the stack of slices at the plurality of preselected mean temperatures previously obtained by the thermal resistance of the stack of slices at the plurality of preselected mean temperatures subsequently obtained. From this, the long-term thermal resistance of the foam at each of the plurality of preselected mean temperatures can be determined when a difference between the aging factor of surface slices and the aging factor of core slices is within a predetermined value, such as within 12% of their mean value, for 50 millimeter and 75 millimeter thick boards. The long-term thermal resistance of the foam at each of the plurality of preselected mean temperatures can be calculated using the procedure described, for example, in CAN/ULC-S770-09 (Section 7.2), the cited portion of which being incorporated herein by reference.

Now referring to the Figures, particularly FIG. 1, a method 10 for measuring long term thermal resistance of closed-cell foam is shown according to some non-limiting embodiments or aspects. The foam may be embodied in the form of a foam board, for example, and may comprise polyisocyanurate (sometimes referred to as "polyiso") foam, expanded polystyrene foam, extruded polystyrene foam, or phenolic foam.

At a step 12, an initial thermal resistance of a full thickness sample of the foam, such as a foam board, is determined at a plurality of mean temperatures within the temperature range of, for example, 10° F. to 150° F., such as 10° F. to 105° F., or 20° F. to 75° F. The full thickness sample is kept inside the heat flow meter throughout step 12. The full thickness sample is then removed from the heat flow meter once step 12 is complete.

Next, at step 14, a stack of core slices and a stack of surface slices, in some cases at least two stacks of core slices and at least two stacks of surface slices is prepared from the foam. These slices have a thickness that is less than the full thickness of the foam board. In some cases, a stack of four or more surface slices and a stack of four or more core slices, each slice within a stack being oriented in the same direction, is prepared.

According to step 16, within no more than 14 days, such as 10 to 14 days, after the foam is produced, a stack of slices from the foam is placed between two isothermal plates in a calibrated heat flow meter comprising a heat flux transducer and an initial thermal resistance of the slack of foam board slices at a plurality of preselected mean temperatures within the temperature range of 10° F. to 150° F., such as 10° F. to 105° F., or 20° F. to 75° F., is measured. In some implementations, the initial thermal resistance of the stack of slices is measured at at least 5, at least 6 at least 8, or in some cases, at least 9, at least 10 or at least 12 different preselected mean temperatures within the temperature range of 10° F. to 150° F., such as 10° F. to 105° F. or 20° F. to 75° F. The stack of slices is kept inside the heat flow meter throughout step 16.

Next, at step 18, the stack of slices is removed from the heat flow meter.

According to step 20, the stack of foam slices is placed between two isothermal plates in a calibrated heat flow meter at a time calculated to represent a selected aging period of the sliced foam (such as 5 years or more) and the thermal resistance of the stack of slices is measured at a plurality of preselected mean temperatures within the temperature range of 10° F. to 150° F., such as 10° F. to 105° F., or 20° F. to 75° F. The thermal resistance can be measured at, for example, at least 5, at least 6, at least 8, at least 9, or, in some cases, at least 10 or at least 12 different, preselected mean temperatures within the foregoing temperature range. In some implementations, this subsequent measurement of the thermal resistance of the stack of slices is conducted at the same plurality of preselected mean temperatures at which the initial thermal resistance values were measured. The stack of slices is kept inside the heat flow meter throughout step 20.

As is apparent from step 22, if the thermal resistance of each stack of slices has been measured at the plurality of preselected mean temperatures after the aging period, then the process proceeds to step 24. If not, then steps 16, 18 and 20 are repeated until the thermal resistance has been measured at the plurality of preselected mean temperatures after the aging period for all of the previously prepared stacks of foam slices.

At a step 24, the long-term thermal resistance of the stack of slices at each of the plurality of preselected mean temperatures is calculated. This calculation can be conducted by first determining an aging factor of each stack of slices at each of the plurality of preselected mean temperatures. This can be accomplished by, for example, dividing the initial thermal resistance of the stack of slices at the plurality of preselected mean temperatures by the thermal resistance of the stack of slices at the plurality of preselected mean temperatures after the aging period. When a difference between the aging factor of surface slices and the aging factor of core slices is within a predetermined value, such as within 12% of their mean value, for 50 millimeter and 75 millimeter thick boards, the long-term thermal resistance of the foam board at each of the plurality of preselected mean temperatures can then be calculated using the procedure described, for example, in CAN/ULC-S770-09 (Section 7.2).

Various aspects of the subject matter described in this specification are set out in the following numbered clauses:

Clause 1. A method for measuring long-term thermal resistance of closed-cell foam, comprising: (a) placing a stack of slices cut from a sample of the foam between two isothermal plates in a calibrated heat flow meter comprising a heat flux transducer; (b) measuring an initial thermal resistance of the same stack of slices at a plurality of preselected mean temperatures within the temperature range of 10° F. to 150° F., wherein the stack of foam slices stays inside the heat flow meter throughout step (b); (c) at a time calculated to represent a selected aging period of the foam, placing the same stack of slices between two isothermal plates in a calibrated heat flow meter and measuring the thermal resistance of the stack of slices at a plurality of preselected mean temperatures within the temperature range of 10° F. to 150° F., wherein the stack of foam slices stays inside the heat flow meter throughout the measuring portion of step (c); and (d) calculating the long-term thermal resistance of the foam at each of the plurality of preselected mean temperatures.

Clause 2. The method of clause 1, wherein the initial thermal resistance of the stack of slices is measured at a plurality of preselected mean temperatures within the temperature range of 10° F. to 105° F., or 20° F. to 75° F.

Clause 3. The method of clause 1 or clause 2, wherein the initial thermal resistance of the stack of slices is measured at at least 5, at least 6 at least 8, at least 9, at least 10 or at least 12 different preselected mean temperatures.

Clause 4. The method of one of clause 1 to clause 3, wherein the thermal resistance of the stack of slices is measured in step (c) at at least 5, at least 6 at least 8, at least 9, at least 10 or at least 12 different, preselected mean temperatures.

Clause 5. The method of one of clause 1 to clause 4, wherein the measurement of the thermal resistance of the stack of slices in step (c) is conducted at the same plurality of preselected temperatures at which the initial thermal resistance values are measured in step (b).

Clause 6. The method of one of clause 1 to clause 5, wherein initial thermal resistance is measured within 14 days after the foam is produced, such as during the period that is 10 to 14 days after the foam is produced.

Clause 7. The method of one of clause 1 to clause 6, wherein the foam comprises polyisocyanurate foam, expanded polystyrene foam, extruded polystyrene foam, or phenolic foam, such as where the foam is produced using a physical blowing agent, such as a hydrocarbon, such as any of the pentane isomers including n-pentane, cyclopentane and/or isopentane and/or a halogenated blowing agent, including hydrofluoroolefins (HFOs), such as, hydrochlorofluoroolefins ("HCFO"), for example, 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4, 4-hexafluorobutene-2 (E and/or Z isomers), and 2-chloro-1, 1,1,3,4,4,4-heptafluorobutene-2 (E and/or Z isomers), pentafluoropropene, tetrafluoropropene, 2,3,3,3-tetrafluoropropene, 1,2,3,3-tetrafluoropropene, trifluoropropene, tetrafluorobutene, pentafluorobutene, hexafluorobutene, heptafluorobutene, heptafluoropentene, octafluoropentene, and nonafluoropentene.

Clause 8. The method of one of clause 1 to clause 7, wherein the foam is in the form of a foam board, such as a foam board having a thickness of no more than 3 inches (7.62 cm), such as a thickness of 1 to 3 inches (2.54 to 7.62 cm), 1½ to 3 inches (3.81 to 7.62 cm) or 2 inches (5.08 cm).

Clause 9. The method of clause 8, wherein, prior to step (a), the initial thermal resistance of a sample having a full thickness sample of the foam is determined at a plurality of preselected mean temperatures, such as at at least 5, at least 6 at least 8, at least 9, at least 10 or at least 12 different preselected mean temperatures within the temperature range of 10° F. to 150° F., 10° F. to 105° F., or 20° F. to 75° F., wherein the full thickness sample is kept inside the heat flow meter throughout this step.

Clause 10. A method for measuring long-term thermal resistance of closed-cell foam board, comprising: (a) determining an initial thermal resistance of a full thickness sample of the foam board by placing the full thickness sample between two isothermal plates in a calibrated heat flow meter comprising a heat flux transducer, the initial thermal resistance of the full thickness sample being determined at a plurality of preselected mean temperatures within the temperature range of 10° F. to 150° F., wherein the full thickness sample is kept inside the heat flow meter throughout step (a); (b) preparing a stack of core slices and a stack of surface slices from the foam board; (c) placing a stack of slices from the foam board between two isothermal plates in a calibrated heat flow meter comprising a heat flux transducer; (d) measuring an initial thermal resistance of the slack of foam board slices at a plurality of preselected mean temperatures within the temperature range of 10° F. to 150° F., such measurement occurring within 14 days after the foam board is produced, wherein the stack of foam slices is kept inside the heat flow meter throughout step (d); (e) removing the stack of foam slices from the heat flow meter; (f) at a time calculated to represent a selected aging period of the foam, placing the stack of slices between two isothermal plates in a calibrated heat flow meter and measuring the thermal resistance of the stack of slices at a plurality of preselected mean temperatures within the temperature range of 10° F. to 150° F., wherein the stack of foam slices is kept inside the heat flow meter through step (f); (g) repeating steps (c) through (f) for each stack of core slices and each stack of surface slices prepared in step (b); (h) determining an aging factor of each stack of core slices and each stack of surface slices at each of the plurality of preselected mean temperatures; and (i) calculating the long-term thermal resistance of the foam board at each of the plurality of mean temperatures.

Clause 11. The method of clause 10, wherein the initial thermal resistance of the stack of slices is measured at a plurality of preselected mean temperatures within the temperature range of 10° F. to 105° F., or 20° F. to 75° F.

Clause 12. The method of clause 10 or clause 11, wherein the initial thermal resistance of the stack of slices is measured at at least 5, at least 6 at least 8, at least 9, at least 10 or at least 12 different preselected mean temperatures.

Clause 13. The method of one of clause 10 to clause 12, wherein the thermal resistance of the stack of slices is measured in step (d) at at least 5, at least 6 at least 8, at least 9, at least 10 or at least 12 different, preselected mean temperatures.

Clause 14. The method of one of clause 10 to clause 13, wherein the measurement of the thermal resistance of the stack of slices in step (f) is conducted at the same plurality of preselected temperatures at which the initial thermal resistance values are measured in step (d).

Clause 15. The method of one of clause 10 to clause 14, wherein the initial thermal resistance is measured during the period that is 10 to 14 days after the foam is produced.

Clause 16. The method of one of clause 10 to clause 15, wherein the foam comprises polyisocyanurate foam, expanded polystyrene foam, extruded polystyrene foam, or phenolic foam, such as where the foam is produced using a physical blowing agent, such as a hydrocarbon, such as any of the pentane isomers including n-pentane, cyclopentane and/or isopentane and/or a halogenated blowing agent, including hydrofluoroolefins (HFOs), such as, hydrochlorofluoroolefins ("HCFO"), for example, 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4, 4-hexafluorobutene-2 (E and/or Z isomers), and 2-chloro-1, 1,1,3,4,4,4-heptafluorobutene-2 (E and/or Z isomers), pentafluoropropane, tetrafluoropropene, 2,3,3,3-tetrafluoropropene, 1,2,3,3-tetrafluoropropene, trifluoropropene, tetrafluorobutene, pentafluorobutene, hexafluorobutene, heptafluorobutene, heptafluoropentene, octafluoropentene, and nonafluoropentene.

Clause 17. The method of one of clause 10 to clause 16, wherein the foam board has a thickness of no more than 3 inches (7.62 cm), such as a thickness of 1 to 3 inches (2.54 to 7.62 cm), 1½ to 3 inches (3.81 to 7.62 cm) or 2 inches (5.08 cm).

Clause 18. The method of clause 17, wherein the initial thermal resistance of the full thickness sample of the foam board is determined at at least 5, at least 6 at least 8, at least 9, at least 10 or at least 12 different preselected mean temperatures within the temperature range of 10° F. to 105° F., or 20° F. to 75° F.

The non-limiting and non-exhaustive examples that follow are intended to further describe various non-limiting and non-exhaustive embodiments without restricting the scope of the embodiments described in this specification.

EXAMPLES

Example 1

Figure 2:
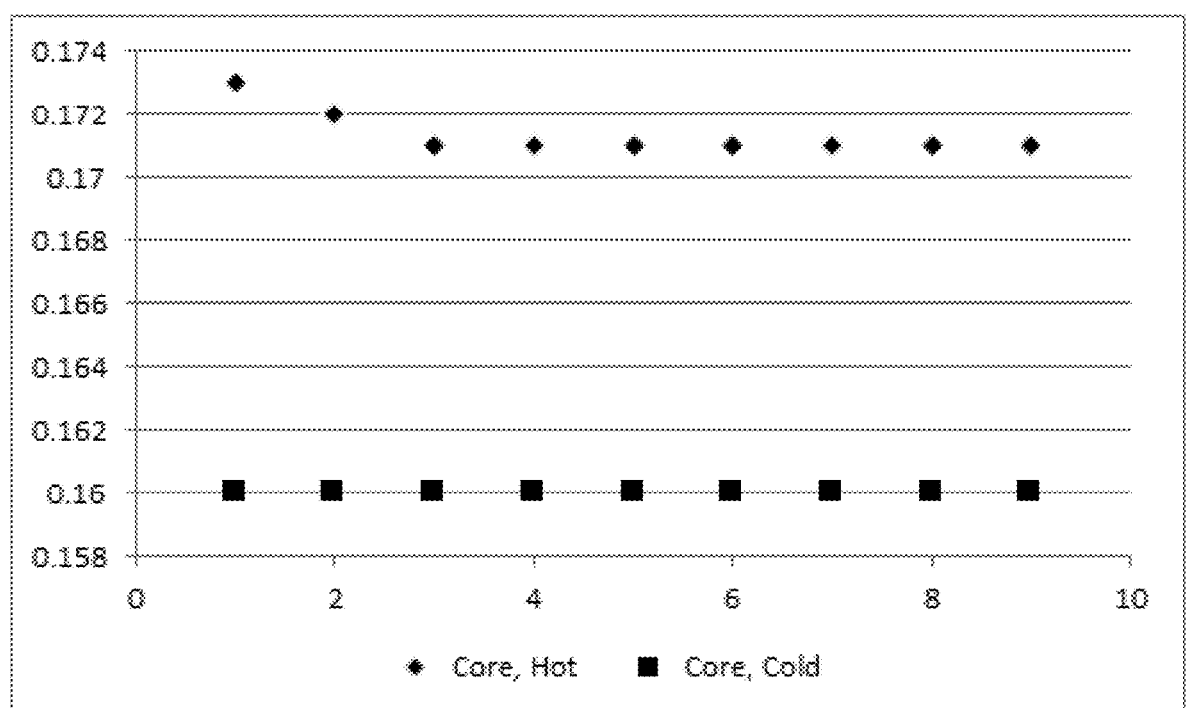
FIG. 2 is a table illustrating the results of Example 1.

A stack of core slices from a 2 inch thick polyiso foam board were prepared according to the procedure described in CAN/ULC-S770-09. The stack of core slices was placed in a LaserComp FOX304 heat flow meter (available from TA Instruments). The K-factor of the stack of core slices was repeatedly (9 repeats) determined at a mean temperature of 30° F. and at a mean temperature of 105° F., without removing the stack of slices from the heat flow meter. Results are illustrated in FIG. 2. It was found that there was no variation in the measured thermal conductivity beyond the normal variation of the measuring instrument after 9 repeats.

Example 2

Figure 3:
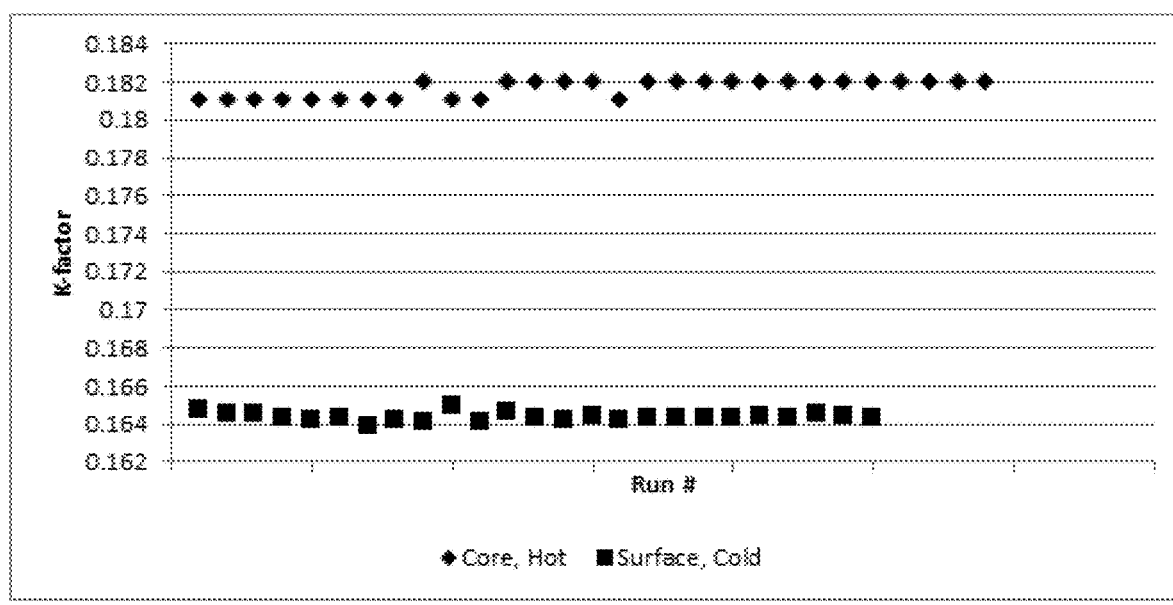
FIG. 3 is a table illustrating the results of Example 2.

A stack of core slices and surface slices was prepared and placed in a heat flow meter in the same manner as described in Example 1. The stack of core slices was tested at a mean temperature of 105° F. over 12 hours (29 repeats) and the stack of surface slices was tested at a mean temperature of 20° F. over 16 hours (25 repeats). Each stack of slices remained inside the heat flow meter between all repeats. Results are illustrated in FIG. 3. It was observed that there was no variation of K-factor above the normal variation of the instrument.

Based on the observed results of Examples 1 and 2 it is believed that the same set of core and surface slices may be used to successfully determine the long-term thermal resistance of a closed-cell foam at a plurality of preselected mean temperatures within the temperature range of 10° F. to 150° F., using a heat flow meter.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112, first paragraph, and 35 U.S.C. § 132(a).

What is claimed is:

1. A method for measuring long-term thermal resistance of closed-cell foam, comprising:
 (a) placing a stack of foam slices cut from a sample of the foam between two isothermal plates in a calibrated heat flow meter;
 (b) measuring an initial thermal resistance of the same stack of foam slices at a plurality of preselected mean temperatures within the temperature range of 10° F. to 150° F. wherein the stack of foam slices stays inside the heat flow meter throughout step (b);
 (c) at a time calculated to represent a selected aging period of the foam, placing the stack of foam slices between two isothermal plates in a calibrated heat flow meter, which may be the same heat flow meter used in steps (a) and (b) or a different heat flow meter from the calibrated heat flow meter used in steps (a) and (b), and measuring an aged thermal resistance of the stack of foam slices at the plurality of preselected mean temperatures within the temperature range of 10° F. to 150° F. wherein the stack of foam slices stays inside the heat flow meter throughout the measuring portion of step (c); and (d) calculating, from the initial thermal resistance measured in step (b) and the aged thermal resistance measured in step (c), the long-term thermal resistance of the foam at each of the plurality of preselected mean temperatures.

2. The method of claim 1, wherein the measurement of the thermal resistance of the stack of foam slices in step (c) is conducted at the same plurality of preselected temperatures at which the initial thermal resistance values are measured in step (b).

3. The method of claim 1, wherein the initial thermal resistance is measured during a period that is 10 to 14 days after the foam is produced.

4. The method of claim 1, wherein the initial thermal resistance of the stack of foam slices is measured at at least 5 different preselected mean temperatures.

5. The method of claim 4, wherein the thermal resistance of the stack of foam slices is measured in step (c) at at least 5 different preselected mean temperatures.

6. The method of claim 1, wherein the initial thermal resistance of the stack of foam slices is measured at at least 9 different preselected mean temperatures.

7. The method of claim 6, wherein the thermal resistance of the stack of foam slices is measured in step (c) at at least 9 different preselected mean temperatures.

8. The method of claim 1, wherein the calculating comprises:

(1) determining an aging factor of each stack of foam slices at each of the plurality of preselected mean temperatures by dividing the initial thermal resistance of the stack of foam slices at the plurality of preselected mean temperatures measured in step (b) by the aged thermal resistance of the stack of foam slices at the plurality of preselected mean temperatures measured in step (c); and (2) when a difference between the aging factor of surface foam slices and the aging factor of core foam slices is within a predetermined value, calculating the long-term thermal resistance of the foam according to the procedure described in CAN/ULC-S770-09 (Section 7.2).

9. The method of claim 8, wherein the predetermined value is 12% of the mean value of the aging factor of the surface foam slices and the aging factor of the core foam slices.

10. The method of claim 1, wherein, prior to step (a), an initial thermal resistance of a full thickness sample of the foam is determined at a plurality of preselected mean temperatures within the temperature range of 10° F. to 150° F. wherein the full thickness sample is kept inside the heat flow meter throughout this step.

11. The method of claim 10, wherein the initial thermal resistance of the full thickness sample is determined at at least 5 different preselected mean temperatures.

12. The method of claim 11, wherein the initial thermal resistance of the full thickness sample is determined at at least 9 different preselected mean temperatures.

* * * * *